United States Patent [19]

DiBella et al.

[11] Patent Number: 5,216,493

[45] Date of Patent: Jun. 1, 1993

[54] MULTIPOINT DIGITAL AUTOMATIC WHITE BALANCE FOR A VIDEO SYSTEM

[75] Inventors: James A. DiBella; John R. Fredlund, both of Rochester, N.Y.

[73] Assignee: Eastman Kodak Company, Rochester, N.Y.

[21] Appl. No.: 836,873

[22] Filed: Feb. 19, 1992

[51] Int. Cl.$^5$ .................. H04N 9/11; H04N 9/64; H04N 3/36; H04N 5/253

[52] U.S. Cl. ........................... 358/29; 358/54; 358/214

[58] Field of Search .................. 358/29, 29 C, 54, 214

[56] References Cited

U.S. PATENT DOCUMENTS

| | | |
|---|---|---|
| 4,418,358 | 11/1983 | Poetsch et al. ............... 358/54 |
| 4,679,073 | 7/1987 | Hayashi ..................... 358/29 |
| 4,706,108 | 11/1987 | Kumagai et al. . | |
| 4,746,970 | 5/1988 | Hosokawa et al. . | |
| 4,774,564 | 9/1988 | Konishi ..................... 358/29 |
| 4,814,864 | 3/1989 | Pritchard . | |
| 4,845,551 | 7/1989 | Matsumoto . | |
| 4,951,134 | 8/1990 | Nakasima et al. ............. 358/29 |
| 4,982,290 | 1/1991 | Nishi et al. ................. 358/29 |
| 5,038,216 | 8/1991 | Easterly et al. ............... 358/54 |
| 5,099,316 | 3/1992 | Ogawa ..................... 358/29 |

Primary Examiner—John K. Peng
Assistant Examiner—John W. Miller
Attorney, Agent, or Firm—Parkhurst, Wendel & Rossi

[57] ABSTRACT

A multipoint digital automatic white balance system is provided that automatically compensates for changes in illumination conditions. Three color channels are balanced by measuring the relative output of the red to green channels and the blue to green channels at many different illumination levels. Base line measurements obtained in the green channel are used to create calibrated green channel data that is stored in a green channel LUT, which in turn is used to create corresponding red and blue channel data that is stored in red and blue LUTs. In operation, digitized red, green and blue input signals are applied to the red, green and blue LUTs to generate white balance corrected red, green and blue output signals.

7 Claims, 2 Drawing Sheets

MULTIPOINT DIGITAL AUTOMATIC WHITE BALANCE FOR A VIDEO SYSTEM

FIELD OF THE INVENTION

The invention relates in general to video signal processing circuitry. The invention relates more specifically to an automatic color balance circuit for use in video systems that measures the relative output between image channels at many different illumination levels to construct color balance look-up-tables (LUT's) based on base line data obtained from one of the image channels.

BACKGROUND

It is necessary in video imaging systems to balance the output of the three color channels such that white input to the system will appear as white output. In video cameras, color or white balance correction is often accomplished by a white balance circuit that is activated while the video camera images a white card (or some other white reference) in order to obtain a white reference level. The white balance is adjusted in some conventional film-to-video image conversion systems automatically on power up when the imaging head is looking at the open film gate, i.e. before the film to be converted is introduced in the optical path of the film-to-video conversion system. In either case, the white balance adjustment is generally set at a prescribed illumination level and other illumination levels are left to fall where they may as far as white balance is concerned, i.e. no compensation in white balance is provided for changes in the illumination level.

To be required to reset the white balance whenever changes in illumination conditions occur in the above-described systems is clearly inconvenient and impractical. It is therefore an object of the invention to provide a system for automatically correcting the white balance in a video system to compensate for any change in illumination that may occur in the video system.

SUMMARY OF THE INVENTION

The invention provides a multipoint digital automatic white balance system that automatically compensates for changes in illumination conditions over a wide range. More specifically, three color channels are balanced by measuring the relative output between the color channels (preferably red to green and blue to green) many different illumination levels. Base line measurements obtained from one of the channels (preferably the green channel) are used to create calibrated channel data that is stored in a LUT. The calibrated channel data is used in turn to create corresponding data for the other channels which is then stored in separate LUTs. In operation, digitized red, green and blue input signals are applied to the LUTs to generate white balance corrected red, green and blue output signals.

BRIEF DESCRIPTION OF THE DRAWINGS

With the above as background, reference should now be made to the following detailed description of the preferred embodiment and the accompanying drawings, in which.

DETAILED DESCRIPTION OF THE PREFERRED EMBODIMENT

The invention will be described with reference to its implementation in a film-to-video conversion system. It will be understood, however, that the invention is not limited to the specific application described below, but can be incorporated into any video processing system requiring white balance correction.

Figure 1:
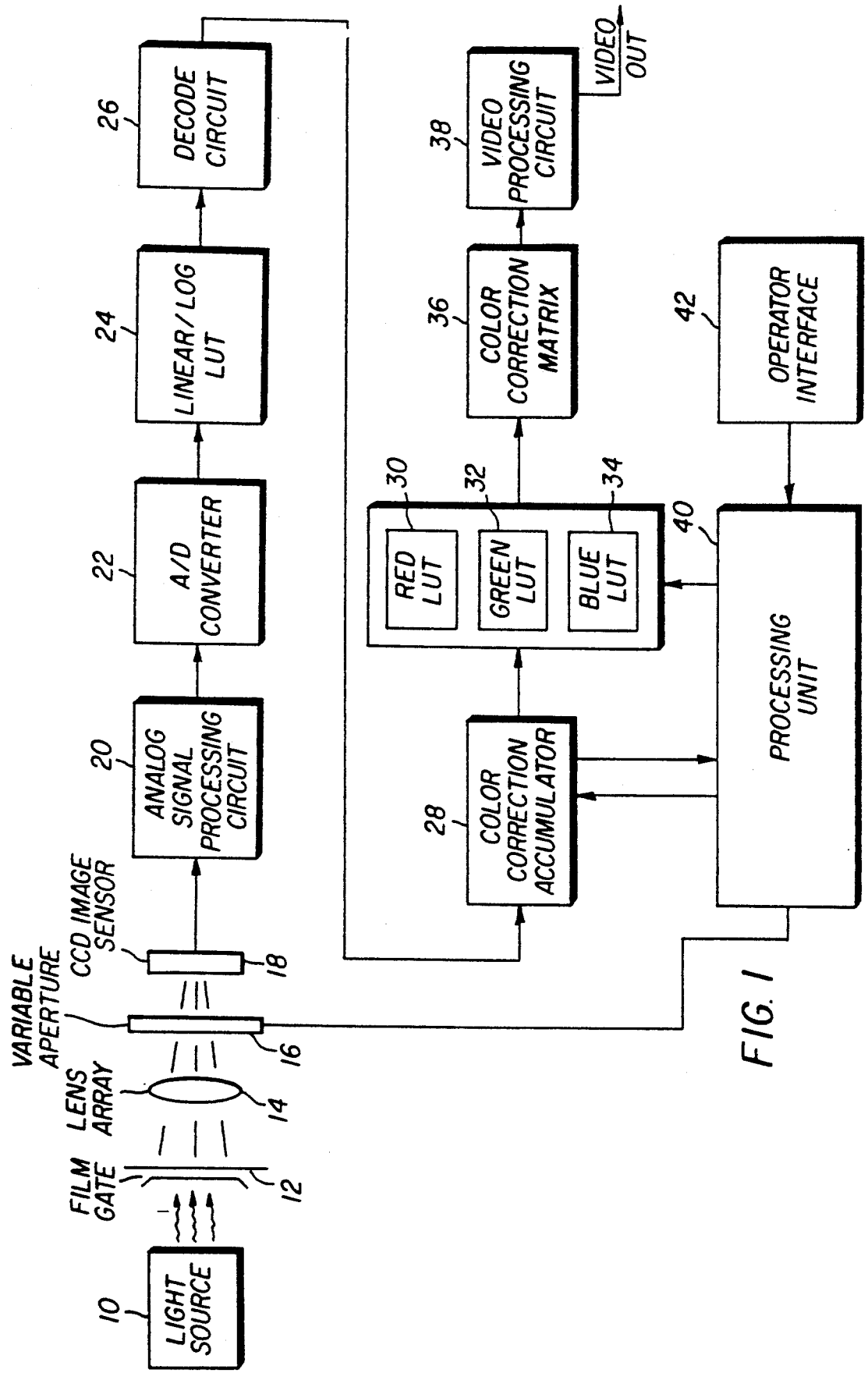
FIG. 1 illustrates a schematic block diagram of a film-to-video conversion system incorporating the present invention.

Referring now to the FIG. 1, a film-to-video conversion system is shown including: a tungsten-halogen light source 10; a film gate 12; a lens array 14; a variable aperture 16; a solid-state CCD image sensor device 18 coupled to an analog signal processing circuit 20; an analog-to-digital (A/D) converter 22 coupled to the analog signal processing circuit 20; a linear to logarithmic conversion LUT 24 coupled to the A/D converter 22; a decode circuit 26 coupled to the output of the linear to logarithmic conversion LUT 24; a color correction accumulator 28 coupled to the decode circuit 26; red, green and blue LUTs 30–34 coupled to the output of the color correction accumulator 28; a color correction matrix 36 coupled to the red, green and blue LUTs 30–34; and a video processing circuit 38 coupled to the color correction matrix 36. A processing unit 40 controls the overall operation of the system including the variable aperture 16, the color correction accumulator 28, and the loading of data into the red, green and blue LUTs 30–34 in response to commands entered by an operator via an operator interface 42.

In operation, light from the light source 10 passes through film retained in the film gate 12 and is focused by the lens array 14 onto the CCD image sensor device 18. The amount of light received at the CCD image sensor device 18 is controlled by the variable aperture 16. The CCD image sensor device 18 converts the received light, i.e. the image of the film retained in the film gate 12, to electrical signals.

The CCD image sensor device 18 preferably includes a color filter array to spatially multiplex red, green and blue image information. Thus, the single CCD image sensor device 18 can be used to generate red, green and blue channel image data, although the luminance resolution is reduced. As the human eye is most sensitive to high spatial frequencies in the green region of the visible-light spectrum, it is desirable to use a color filter array containing a majority of green pixels in order to preserve resolution. U.S. Pat. No. 4,663,661 discloses a preferred color filter array to be utilized in the CCD image sensor device 18, wherein three out of four pixels is coated with a green dye and the remaining pixels are coated alternately with blue and red dyes. To prevent the low spatial frequency of red and blue pixels from producing undesirable color artifacts, a color selective bi-refringent blur filter may be used to pre-blur red and blue pixels over a width of four pixels. Green pixels are blurred over a width of two pixels so that half of the green light that would have fallen on a non-green pixel will fall on the neighboring green pixels. The combination of the color filter array and the birefringement blur filter effectively "encodes" the color image information using a signal sensor with resolution nearly equivalent to that of a three-sensor system or a system that sequentially exposes a single sensor with the use of filters to image red, green and blue image light.

The analog signal from the CCD image sensor device 18 is supplied to the analog signal processing circuit 20 which prepares the analog signal generated by the CCD image sensor device 18 for digitization. The tasks accomplished by the analog signal processing circuit 20 include sample and hold, scaling, and black level insertion. Care must be taken to insure sufficient bandwidth is maintained to allow each pixel signal to settle to its proper voltage regardless of the magnitude of the preceding pixel. This is particularly important in situations where the value of the one color pixel is near maximum while the next is near minimum (for example a saturated red field). In this situation, any difficulty in reproducing the low level pixel will result in regularly recurring artifacts which may be unacceptable.

The output signal from the analog signal processing circuit 20 is supplied to the A/D converter 22 for digitization. The digital signal data output from the A/D converter 22 constitute a linear representation of the CCD image sensor device's analog signal. In order to preserve the dynamic range of the digitized film image as it is digitally processed, the digitized image sensor data must be transformed using logarithmic curve-shaping to produce data which is somewhat proportional to the film's dye density. This is accomplished by the linear to logarithmic LUT 24. An important benefit of dealing with logged sensor data is that multiplying operations are accomplished by simple additions. Additionally, since photographic film is basically a logarithmic sensor, color crosstalk effects induced by the films spectral sensitivities and dye transmittances are most effectively reduced by matrixing logged sensor data.

The output from the linear to logarithmic LUT 24 is supplied to the decode circuit 26. A seven-tap finite impulse response filter is preferably used in the decode circuit 26 to extract green pixel information for non-green pixels. Color-ratio signals are generated for each red and blue pixel. The ratios are then interpolated and recombined with green data to product high resolution RGB video data.

The color correction accumulator 28 receives the fully reconstructed red, green and blue video data from the decoder circuit 26. The color correction accumulator 28 monitors the incoming data values and is used to perform a variety operations on the data under control of the processor unit 40 coupled thereto. The desired operation is specified by the processor unit 40 and is performed simultaneously on the data for each video channel. The operations which can be performed by the color correction accumulator 28 include: 1) the accumulation of the sum of the incoming values, 2) finding the maximum value encountered, 3) finding the minimum value encountered, 4) computing the difference between consecutive data values and determine the largest difference encountered, and 5) to collecting data on the pixels in the corners of the CCD image sensor device 18 for special processing. The results from each operation are preferably available simultaneously for each color on three separate data output channels. Alternately, one of the channels preferably provides the ability to output the result from any of the color channels, as desired, under control of the microprocessor. This allows sequential rather than parallel access to the results which in some cases simplified interfacing.

The red, green and blue LUTs 30–34 are coupled between the color correction accumulator 28 and the color correction matrix 36, and are preferably implemented with static random access memory (RAM) devices. Thus, the data received at the address inputs of the red, green and blue LUTs 30–34 is three channels of fully decoded, full bandwidth red, green and blue image data. This is log illuminance data which may preferable be offset by registers in the color correction accumulator 28 to achieve a user preferred color balance. The primary function of the red, green and blue LUTs 30–34 is to remap the input data values received from the color correction accumulator 28 to appropriate gamma corrected white balanced output data values as will be described in greater detail below.

The outputs from the red, green and blue LUTs 30–34 are supplied to the color correction matrix 36 which performs a matrix operations to minimize the visual effects of color crosstalk. A detailed analysis of the systems spectral characteristics and a regression is performed to calculate the optimum matrix co-efficient. The digital matrix allows for different coefficients to be loaded based on film type, and allows for additional color saturation control of the systems's RGB outputs. After exiting the color correction matrix 36, the digital values are ready for conversion by the video processing circuit 38 to an analog video signal for display on a monitor.

The details of the multipoint auto white balance will now be discussed. As mentioned above, the white balance function is performed by the red, green and blue LUTs 30–34. Upon power up of the system, the processing unit 40 loads base line data previously stored in the processing unit's non-volatile memory into the green LUT 32. The base line data is preferably generated empirically at the manufacturing site and loaded into the memory of the processing unit 40 (for example in a non-volatile read-only-memory) prior to shipment of the system in a user installation. The processing unit 40 then begins the operation of determining the red to green and blue to green ratios based on data provided to the processing unit 40 via the color correction accumulator 28. Once these ratios are determined, the processing unit 40 calculates data tables for the red and blue channels from the base line data previously loaded in the green LUT 32. The processing unit 40 then loads the red and blue LUTs 30 and 34 with the calculated data tables.

More specifically, data is acquired for white balancing by sampling the video data in the three channels "on the fly" and delivering an average value to the processing unit 40 via the color correction accumulator 28. Starting with the variable aperture 16 set to its minimum opening, no slide in the slide gate, the green LUT 32 filled with the base line data, and the red and blue LUTS 30 and 34 filled with zero values, the variable aperture 16 is incrementally opened under control of the processing unit 40 to obtain image data at a number of different illumination levels until the green channel reaches a maximum value which is limited by the hardware of the system, for example the value of 255 (ffh) for an eight bit system. At each incremental step, the values of the green, red and blue channels are stored in three individual input tables within the memory of the processing unit 40. For purposes of illustration, these tables will be called Gin, Rin, Bin. At location (x) of the input tables, the value Gin(x) is used to point into the green LUT 32 (Gout), the value Rin(x) is the location in the red LUT 30 (Rout) to be filled in and the value Bin(x) is the location in the blue LUT 34 (Bout) to be filled in.

$$Gin(x) = A$$

Rin(x) = B
Bin(x) = C

The value at the Gout(A) is then used as data for the Rout(B) and the Bout(C).

Rout(B) = Gout (A)
Bout(C) = Gout (A) For example: if the inputs at a given illumination level are G=150, R=100, B=123, and if in the green LUT 32 at location 150 the stored data value is 165, then a data value of 165 is entered in the red LUT 30 at location 100 and in the blue LUT 34 at location 123. Thus, if looking directly at the illumination source and three different readings of red, green and blue are seen at the input, then once passing through the LUTs 30-34 the output generated will be a white result with three equal values for the red, green and blue channels.

Once the initial values for the red and blue LUTs 30-34 are generated based on actual measured values, data points between two adjacent measured data points must be filled in. This is achieved by generating an incremental constant for a given range of data by taking the difference of the data points and dividing it by the number of data locations which need to be filled (i.e. linear interpolation between any two points). Since the total response of the CCD image sensor device 18 is not necessarily linear, a piece wise linear interpolation must be performed.

$$dR_{out} = \frac{R_{out}(x+n) - R_{out}(x)}{n} = \text{the incremental change in red data}$$

$$R_{out}(y+n) = R_{out}(y) + dR_{out} = \text{the new data value}$$

Figure 2:
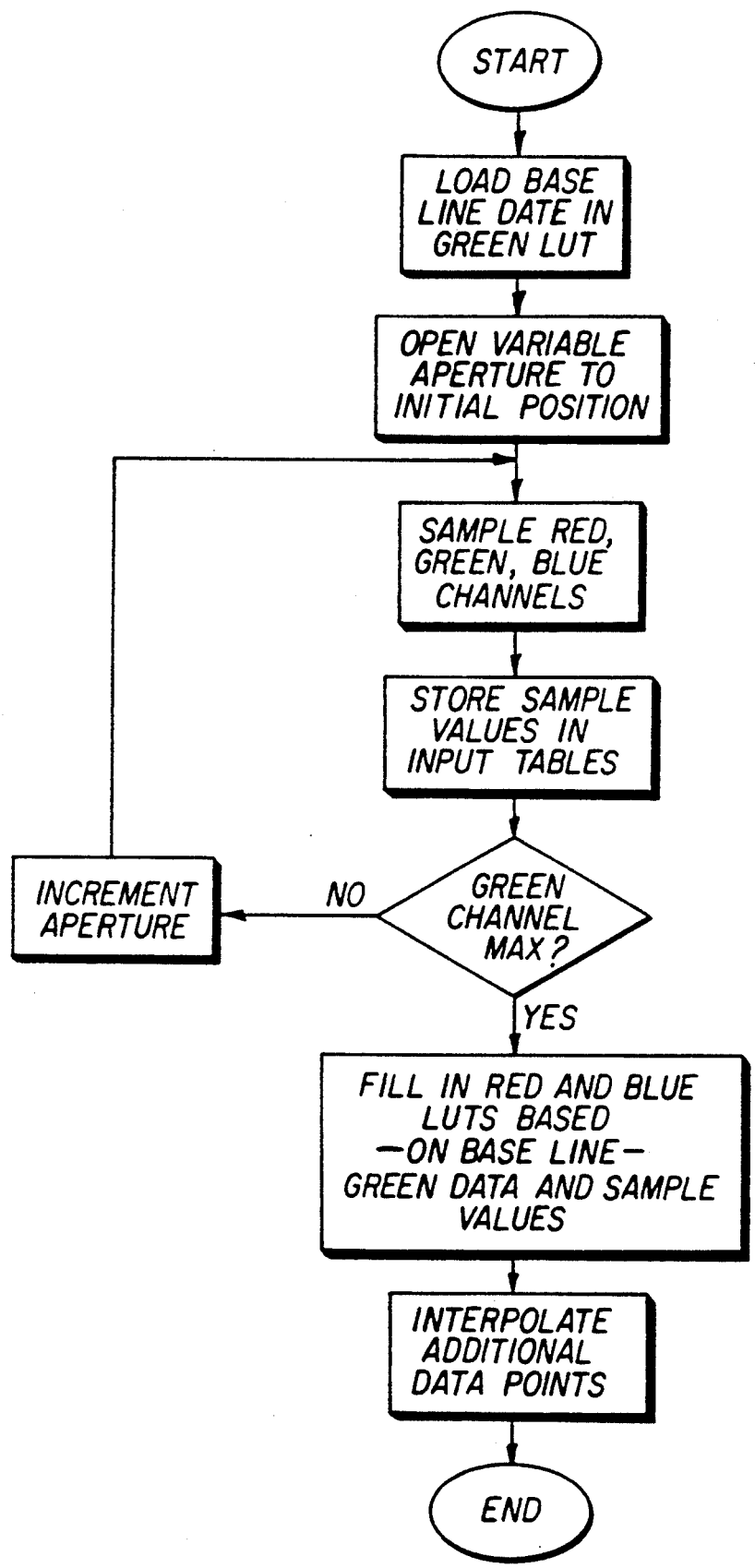
FIG. 2 illustrates a flow diagram of the multipoint automatic white balance performed by the system illustrated in FIG. 1.

If the final viewing source of the balanced image is to be a CRT then log-to-gamma LUTs must also be provided to convert from log to gamma values to achieve the correct color response for a CRT. This log to gamma conversion may also be accomplished by selecting the base line LUT data from which the other color LUTs are determined in such a fashion that white balance is performed on log-to-gamma values. A general flow diagram of the multipoint automatic white balance operation is provided in FIG. 2.

There are a few minor adjustments that should be made to the red, green and blue LUTs 30-34. First, the low end of the tables, the values near black, must be corrected to yield a true black image. In the case of slide reproduction, the blacks on slide film when viewed through an optical system which does not truly have a white light source are not black and thus compensation must be provided. This occurs because during the white balance process there is nothing in the optical path to simulate the gray scale which is produced by film.

Compensation for this factor can be accomplished by modifying the system white balanced curves by values which are determined empirically from measurements of the difference between open gate and actual film gray scale measurements. These measurements would occur prior to manufacture of the system, and the resulting "modifying values" would preferably be stored in the non-volatile read-only-memory of the processing unit 40. It is also possible to generate modifying values for different types of film and to change the red, green and blue LUTs 30-34 such that proper corrections are made for each type. The operator could then select which modifying values are to be loaded via the operator interface based on the type of film to be processed. It should be also be noted that the green signal can still be in its linear range at the upper end of the LUTs (near maximum white) while the red and blue signals start to clip, meaning that the red and blue are out of their linear range and their rate of increase starts to flatten off. Care must therefore be taken to insure that throughout the range of the green signal (in this case 1 to 254) the output of the other two channels is not clipped.

Multipoint digital white balance calibrates the three color channels not only at a reference white point, but at all light levels from black to white. The system is balanced for all gray levels, not just white. The white balance scheme also corrects for drift in color content of lamp, optical, and electronic components, even if this drift is not uniform at all light levels, and also compensates for the differences between an open gate (nominal system response) and actual film transmissivity.

INDUSTRIAL UTILITY

The invention is particularly suited for use in providing automatic white balance adjustment in film-to-video conversion systems as illustrated in the described embodiment. It will be understood, however, that the invention is not limited to the specifically disclosed embodiment, but can employed in any type of video processing system that requires white balance adjustment and may be modified within the scope of the appended claims. For example, the red or blue channels could be used to provide the base line data if so desired.

What is claimed is:

1. An apparatus comprising: means for producing digitized red, green and blue channel data; means for sampling the red, green and blue channel data at a plurality of illumination levels; means for addressing locations within red, green and blue look-up-tables based on the values of the sampled red, green and blue channel data, wherein at least one of the red, green and blue look-up-tables contains base line data; and means for retrieving base line data from the locations addressed in the look-up-table containing base line data and for storing the retrieved base line data in the locations addressed in the look-up-tables that do not contain base line data.

2. An apparatus as claimed in claim 1, wherein the base line data is contained in the green look-up-table.

3. An apparatus as claimed in claim 1, further comprising means for applying modifying values to the data stored in the red, green and blue look-up-tables to correct for gray scale variations casued by the photographic film.

4. A method of providing multipoint white balance correction comprising the steps of: sampling red, green and blue channel data at a plurality of illumination levels; addressing locations within red, green and blue look-up-tables based on the values of the sampled red, green and blue channel data, wherein at least one of the red, green and blue look-up-tables contains base line data; retrieving the base line data from the location addressed in the look-up-table containing the base line data; and storing the retrieved base line data in the locations addressed in the look-up-tables that do not contain base line data.

5. A method of providing multipoint white balance correction as claimed in claim 4, further comprising the steps of: applying red, green and blue image data to inputs of the red, green and blue look-up-tables to generate white balanced corrected red, green and blue image data at outputs of the red, green and blue look-up-tables.

6. A method of providing multipoint white balance correction as claimed in claim 5, further comprising the step of converting the white balanced corrected red, green and blue image data to an analog video signal.

7. A method of providing multipoint white balance correction as claimed in claim 4, wherein the method is utilized to convert an image retained on a photographic film to digital image data, and further comprises the step of applying modifying values to the data stored in the red, green and blue look-up-tables to correct for gray scale variations caused by the photographic film.

* * * * *